US007451833B2

(12) United States Patent
Hahn

(10) Patent No.: US 7,451,833 B2
(45) Date of Patent: Nov. 18, 2008

(54) VIBRATION DAMPENING MECHANISM

(75) Inventor: Norbert Hahn, Hünstetten-Limbach (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/425,891

(22) Filed: Jun. 22, 2006

(65) Prior Publication Data

US 2006/0289185 A1 Dec. 28, 2006

(30) Foreign Application Priority Data

Jun. 23, 2005 (GB) ................................ 0512721.2

(51) Int. Cl.
*B23B 45/02* (2006.01)

(52) U.S. Cl. ........................ 173/104; 173/48; 173/122; 173/162.1

(58) Field of Classification Search ... 173/162.1–162.2, 173/210, 117, 48, 104, 122
See application file for complete search history.

(56) References Cited

U.S. PATENT DOCUMENTS

| | | | | |
|---|---|---|---|---|
| 1,667,271 A * | 4/1928 | Seaver | 173/162.2 |
| 1,845,825 A * | 2/1932 | Benedict | 173/162.2 |
| 1,902,530 A * | 3/1933 | Terry | 173/162.2 |
| 2,632,331 A | 3/1953 | Pinazza | |
| 2,875,731 A | 3/1959 | Settles et al. | |
| 3,509,948 A * | 5/1970 | Besnard | 173/44 |
| 3,845,827 A | 11/1974 | Schulin | |
| 4,279,091 A | 7/1981 | Edwards | |
| 4,282,938 A | 8/1981 | Minamidate | |
| 4,385,665 A | 5/1983 | Knoll | |
| 4,478,293 A | 10/1984 | Weilenmann et al. | |
| 4,945,666 A * | 8/1990 | Henry et al. | 42/1.06 |
| 5,447,295 A * | 9/1995 | Taomo | 267/153 |
| 5,511,533 A | 4/1996 | Waller | |
| 5,833,014 A * | 11/1998 | Dunn | 173/162.2 |
| 6,112,830 A * | 9/2000 | Ziegler et al. | 173/109 |
| 6,907,943 B2 | 6/2005 | Ikuta | |
| 7,252,157 B2 * | 8/2007 | Aoki | 173/162.2 |
| 2002/0000325 A1 | 1/2002 | Wijk et al. | |

FOREIGN PATENT DOCUMENTS

| | | |
|---|---|---|
| DE | 1 281 970 | 10/1968 |

(Continued)

OTHER PUBLICATIONS

Extended European Search Report for application EP 06110671 dated Apr. 15, 2008.

*Primary Examiner*—Rinaldi Rada
*Assistant Examiner*—Lindsay Low
(74) *Attorney, Agent, or Firm*—Michael P. Leary; Adan Ayala

(57) ABSTRACT

A hammer drill includes a body, a motor; a centre of gravity, and a hammer mechanism driven by the motor in reciprocating movement along a hammer axis at a first distance from the centre of gravity. A counter mass is mounted within the body for sliding movement along a slide axis at a second further distance from the centre of gravity. A biasing member biases the counter mass to a mid-position along the slide axis. The biasing means may be a leaf spring or a helical spring. The counter mass may be slideably supported on rods and may be able to twist about a number of axes.

25 Claims, 11 Drawing Sheets

FOREIGN PATENT DOCUMENTS

| | | | |
|---|---|---|---|
| DE | 295 05 125 | U1 | 8/1995 |
| EP | 0 025 153 | | 3/1981 |
| EP | 0 035 984 | | 9/1981 |
| EP | 1 415 768 | A1 | 5/2004 |
| EP | 1422029 | | 5/2004 |
| EP | 1439038 | | 7/2004 |
| EP | 1767315 | | 3/2007 |
| FR | 2237734 | | 2/1975 |
| GB | 1 278 330 | | 6/1972 |
| JP | 52109673 | | 9/1977 |
| WO | WO 81/03518 | | 12/1981 |
| WO | 8802076 | | 3/1988 |

* cited by examiner

VIBRATION DAMPENING MECHANISM

FIELD OF THE INVENTION

The present invention relates to hammer drills, and in particular, to vibration dampening in hammer drills.

BACKGROUND OF THE INVENTION

A typical hammer drill comprises a body attached to the front of which is a tool holder in which a tool bit such as a chisel or a drill bit is capable of being mounted. Within the body is a motor which reciprocatingly drives a piston mounted within a cylinder via a wobble bearing or crank. The piston reciprocatingly drives a ram which repetitively strikes a beat piece which in turn hits the rear end of the chisel of tool bit in well known fashion. In addition, in certain types of hammer drill, the tool holder can rotationally drive the tool bit.

EP1157788 discloses an example of a typical construction of a hammer drill.

BRIEF SUMMARY OF THE INVENTION

The reciprocating motion of the piston, ram and striker to generate the hammering action cause the hammer to vibrate. It is therefore desirable to minimise the amount of vibration generated by the reciprocating motion of the piston, ram and striker.

Accordingly, there is provided a hammer drill comprising:

a body in which is located a motor;

a tool holder capable of holding a tool bit;

a hammer mechanism, driven by the motor when the motor is activated, for repetitively striking an end of the tool bit when the tool bit is held by the tool holder 6;

a counter mass slideably mounted within the body which is capable of sliding in a forward and rearward direction between two end positions;

biasing means which biases the counter mass to a third position located between the first and second positions;

wherein the counter mass is located above the centre of gravity of the hammer;

the mass of the counter mass and the strength of the biasing means being such that the counter mass slidingly moves in forward and rearward direction to counteract vibrations generated by the operation of the hammer mechanism.

BRIEF DESCRIPTION OF THE DRAWINGS

Four embodiments of the present invention will now be described with reference to the accompanying drawings of which.

DETAILED DESCRIPTION OF THE INVENTION

Figure 1:
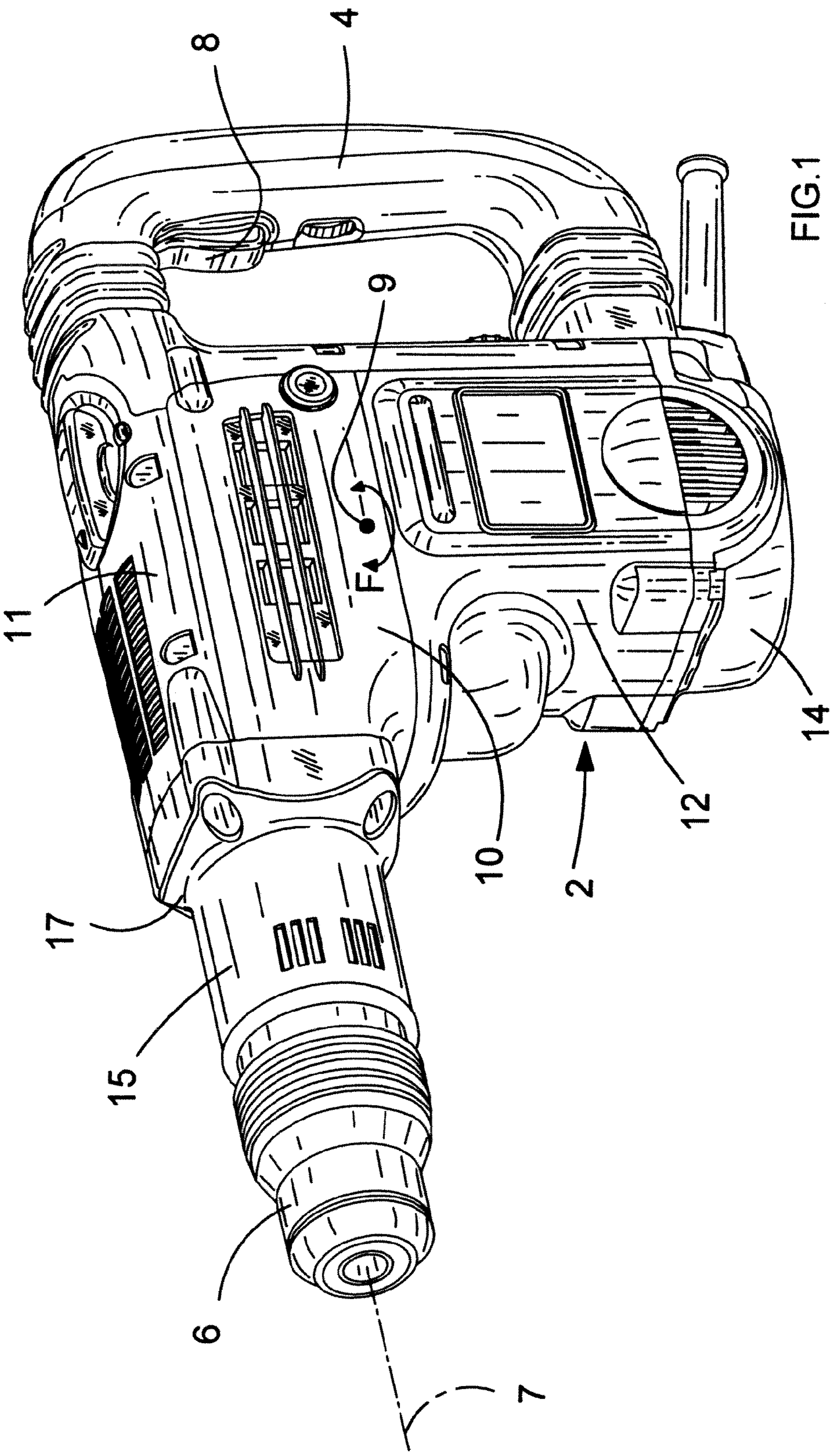
FIG. 1 shows a perspective view of hammer drill.

Referring to FIG. 1, the hammer drill comprises a body 2 in which is located a motor (not shown) which powers the hammer drill. Attached to the rear of the body 2 is a handle 4 by which a user can support the hammer. Mounted on the front of the body 2 is a tool holder 6 in which a drill bit or chisel (not shown) can be mounted. A trigger switch 8 can be depressed by the operator in order to activate the motor of the hammer in order to reciprocatingly drive a hammer mechanism located within the body 2 of the hammer. Designs of the hammer mechanism by which the reciprocating and/rotational drive for the drill bit or chisel are generated from the rotational drive of the motor are well known and, as such, no further detail will be provided.

The first embodiment of the present invention will now be described with reference to FIG. 2.

Figure 2:
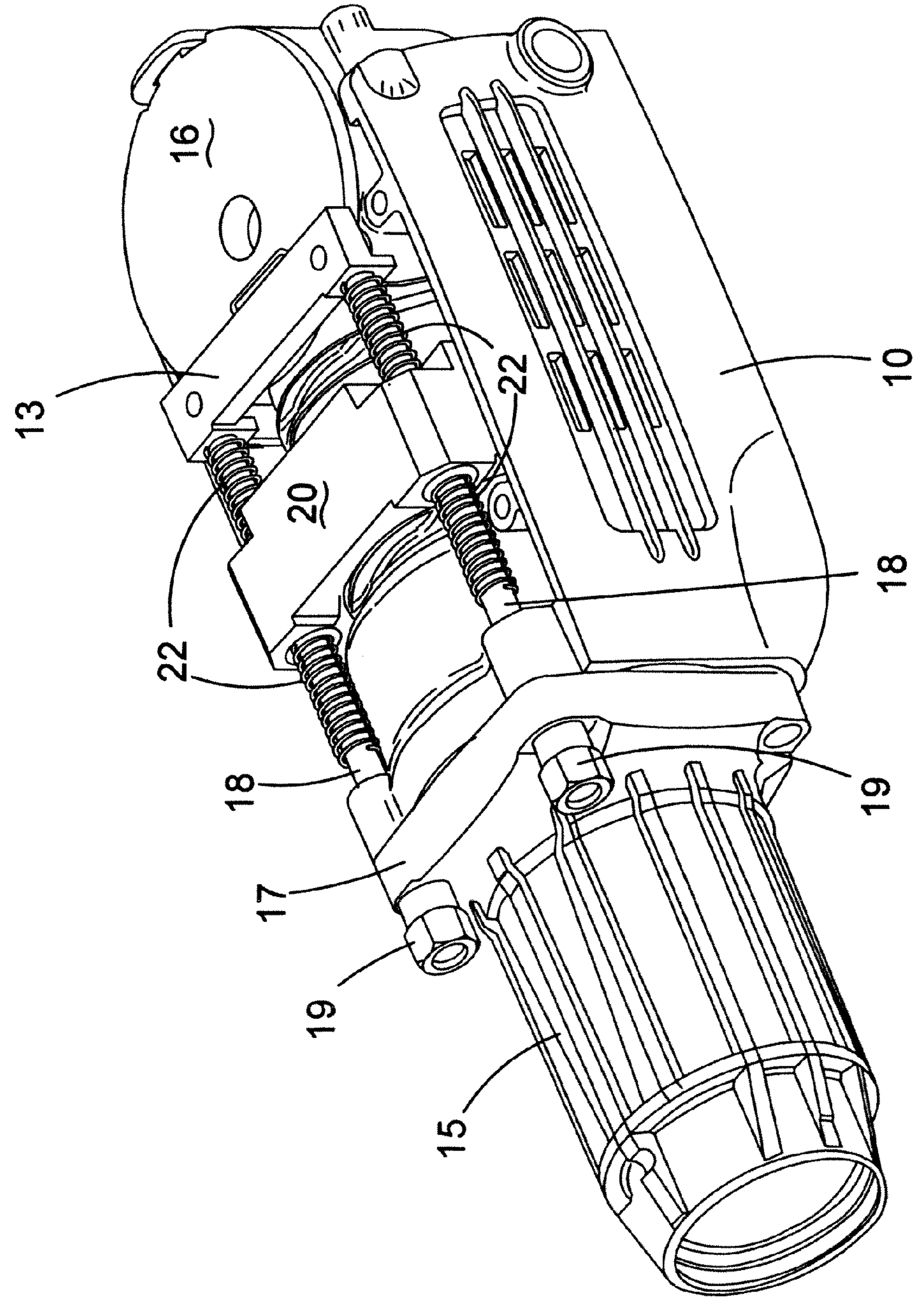
FIG. 2 shows a first embodiment of the anti-vibration mechanism.

Referring to FIG. 2, the first embodiment of the anti-vibration mechanism is shown. The top section 10 (see FIG. 1) of the housing 2 is in the form of a metal cast. The top section 10 is attached to a middle section 12 which in turn is attached to a lower section 14 as best seen in FIG. 1. The top section 10 encloses the hammer mechanism (of typical design) including a crank (not shown) which is located within a rear section 16 of the top section 10, a piston, ram and striker, together with a cylinder in which they are located, none of which are shown. The reciprocating motion of the piston, ram and striker within the cylinder causes the hammer to vibrate in a direction approximately parallel to the direction of travel of the piston, ram and striker. It is therefore desirable to minimise the amount of vibration generated by the reciprocating motion of the piston, ram and striker.

Rigidly attached to the top of the top section 10 are two metal rods 18 which run lengthwise along the top of the top section 10. The rear ends of the rods 18 connect to the top section 10 via a support 13 which is screwed into the top section 10. The front ends of the rods 18 pass through a bore in the top section 10 and then through a flange 17 in a front section 15 of the housing 2, which attaches to the forward end of the top section 10. Nuts 19 are screwed onto the end of the rods 18 to secure them to the front and top sections 10, 15. The rods 18 also perform the function of assisting the rigid connection between the front section 15 and the top section 10.

Mounted on the two rods is a metal weight 20 which is capable of freely sliding backwards and forwards along the two rods 18 in the direction of Arrow E. Four springs 22 are mounted on the two rods 18 between the metal weight 20 and the two ends of the rods 18 where they are attached to the upper section 10. As the body 2 of the hammer vibrates, the metal weight 20 slides backwards and forwards along the two rods 18 compressing the various springs 22 as it moves backwards and forwards. The mass of the metal weight 20 and the strength of the springs 22 have been arranged such that the metal weight 20 slides backwards and forwards out of phase with the movement of the body of the hammer and as such counteracts the vibrations generated by the reciprocating movement of the piston, ram and striker. Thus, with the use of the correct weight for the metal weight 20 and strength of springs 22, the overall vibration of the tool can be reduced.

The anti-vibration mechanism is enclosed by an outer cap 11 (see FIG. 1) which attaches to the top of the top section 10.

The motor is arranged so that its spindle is vertical and is generally located within the middle 12 section. As a large proportion of the weight of the hammer is caused by the motor, which is located below the cylinder, piston, ram and striker, the centre of mass 9 is lower than the longitudinal axis of the cylinder, piston, ram and striker.

The vibration forces act on the hammer in a direction which is coaxial to the axis 7 of travel of the piston, ram and striker. Movement of the metal weight 20 along the rods 18 will counteract vibration in the hammer in a direction parallel to axis 7 of travel of the piston, ram and striker.

As the centre of mass 9 of the hammer is below the axis 7 of travel of the piston, ram and striker, there will also be a twisting moment (Arrow F) about the centre of gravity 9 caused by the vibration. As the sliding metal weight 20 is located above the centre of gravity 9, the sliding movement will also counter the twisting moments (Arrow F) about the centre of gravity 9 caused by the vibration.

Figure 3:
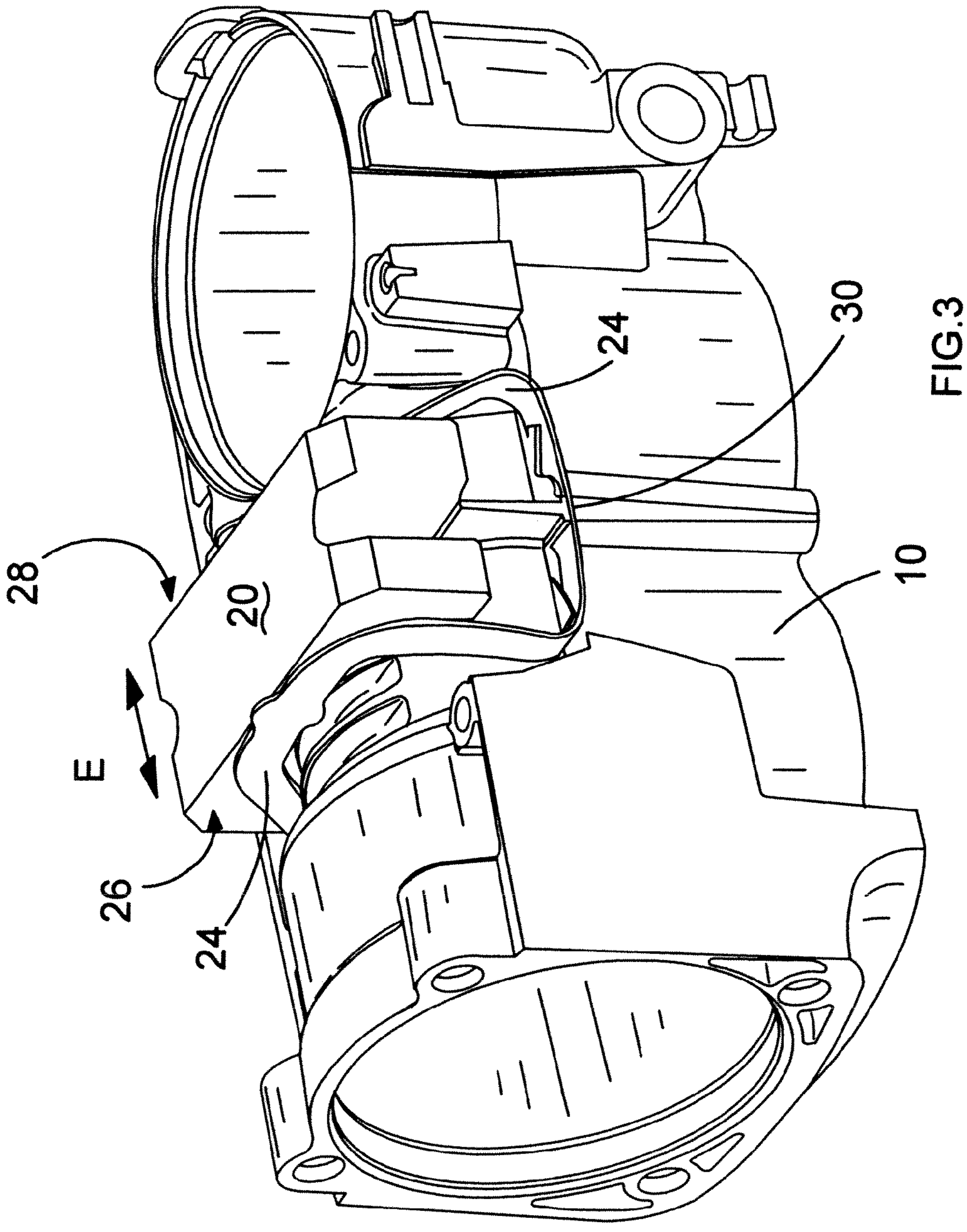
FIG. 3 shows the second embodiment of the anti-vibration mechanism.
Figure 4:
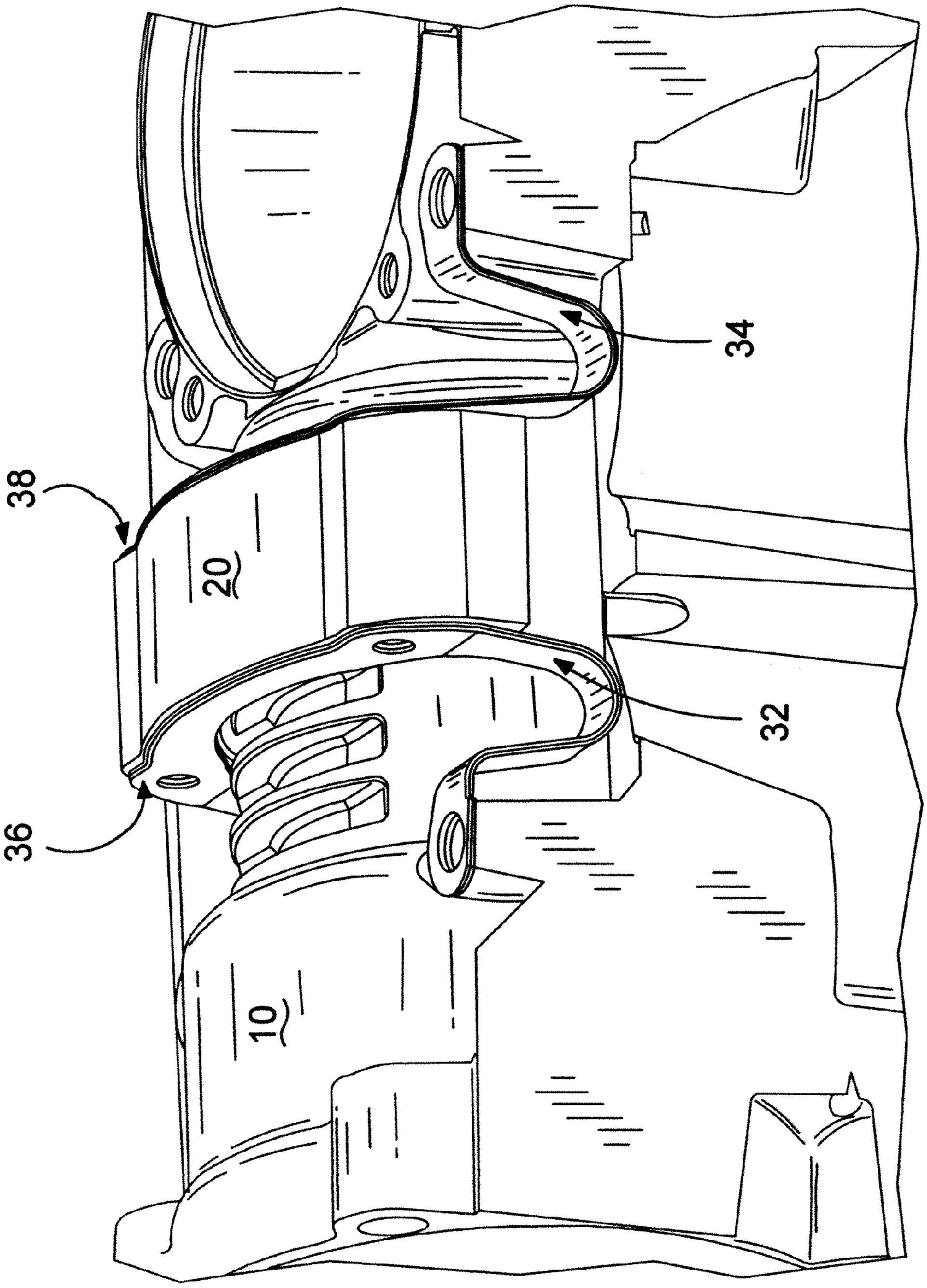
FIG. 4 shows a side view of the third embodiment of the anti-vibration mechanism.

FIG. 3 shows a second embodiment of the anti-vibration mechanism.

This embodiment operates in a similar manner as the first embodiment. Where the same features are present in the second embodiment which are present in the first embodiment, the same reference numbers have been used.

The difference between the first and second embodiment is that the metal weight 20 is now mounted to the top section 10 by the use of a single leaf spring 24 which connects between the metal weight and the top section 10 and supports the metal weight 20 on the top section 10. The metal weight 20 slides backwards and forwards in the direction of Arrows E in the same manner as in the first embodiment. However, due to the shape of the leaf spring 24 which is attached to the front 26 of the metal weight 20 then wraps around the metal weight 20 to the rear 28 of the metal weight 20 the centre 30 of which being attached to the top section 10, enable the metal rods to be dispensed with as the leaf spring 24 in the forwards and backwards direction, produces a resilient affect, whilst preventing the metal weight 20 from rocking in a sideways direction. This simplifies the design considerably and reduces cost. Furthermore, the use of a leaf spring 24 allows some twisting movement of the metal weight 20 about a vertical axis of rotation.

A third embodiment of the present invention is shown in FIGS. 4, 5, 6 and 7.

This embodiment operates in a similar manner as the second embodiment. Where the same features are present in the third embodiment which are present in the second embodiment, the same reference numbers have been used.

Referring to these figures, the single leaf spring of the second embodiment has been replaced by two leaf springs 32, 34. The first leaf spring 32 which connects to the front 36 of the metal weight 20 also connects to the upper section 10 forward metal weight 20. The second leaf 34 spring connects to the rear 38 of the metal weight 20 which then connects to the top section, to the rear of the metal weight 20. The metal weight 20 can oscillate backwards and forwards as with the other two embodiments but is prevented from sideward movement due to the rigidity of the leaf springs 32,34.

Figure 5:
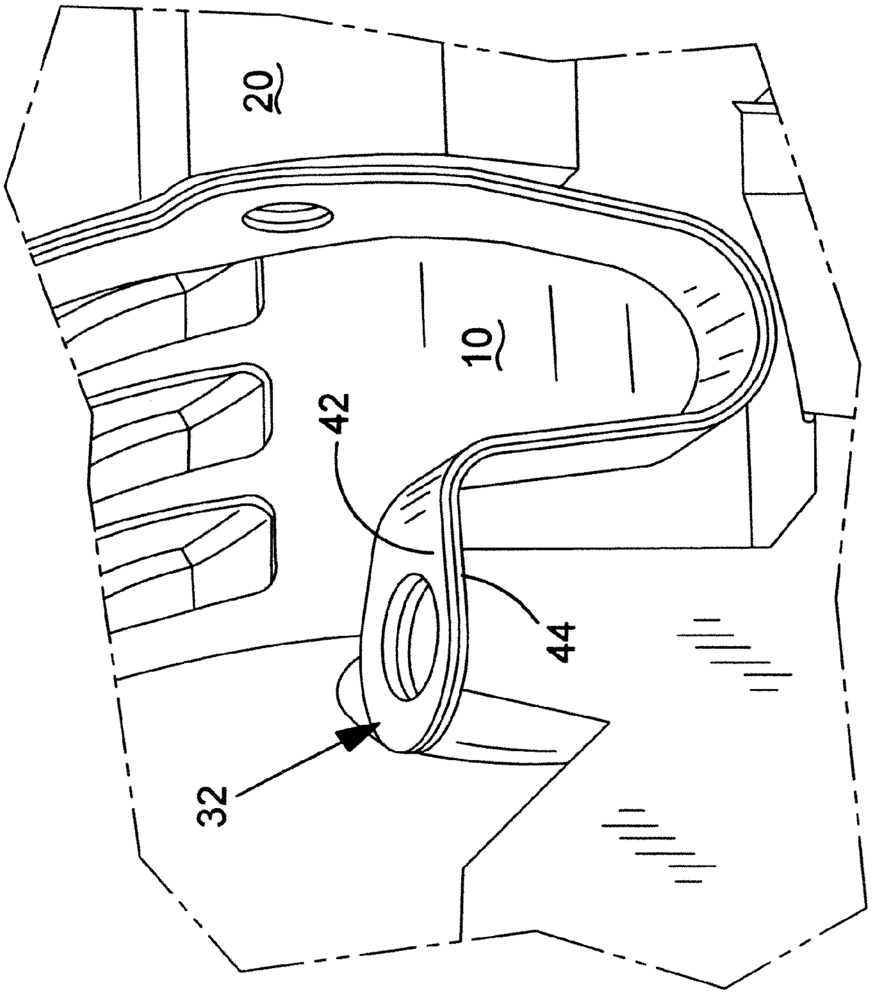
FIG. 5 shows a close-up of a leaf spring of the third embodiment.
Figure 6:
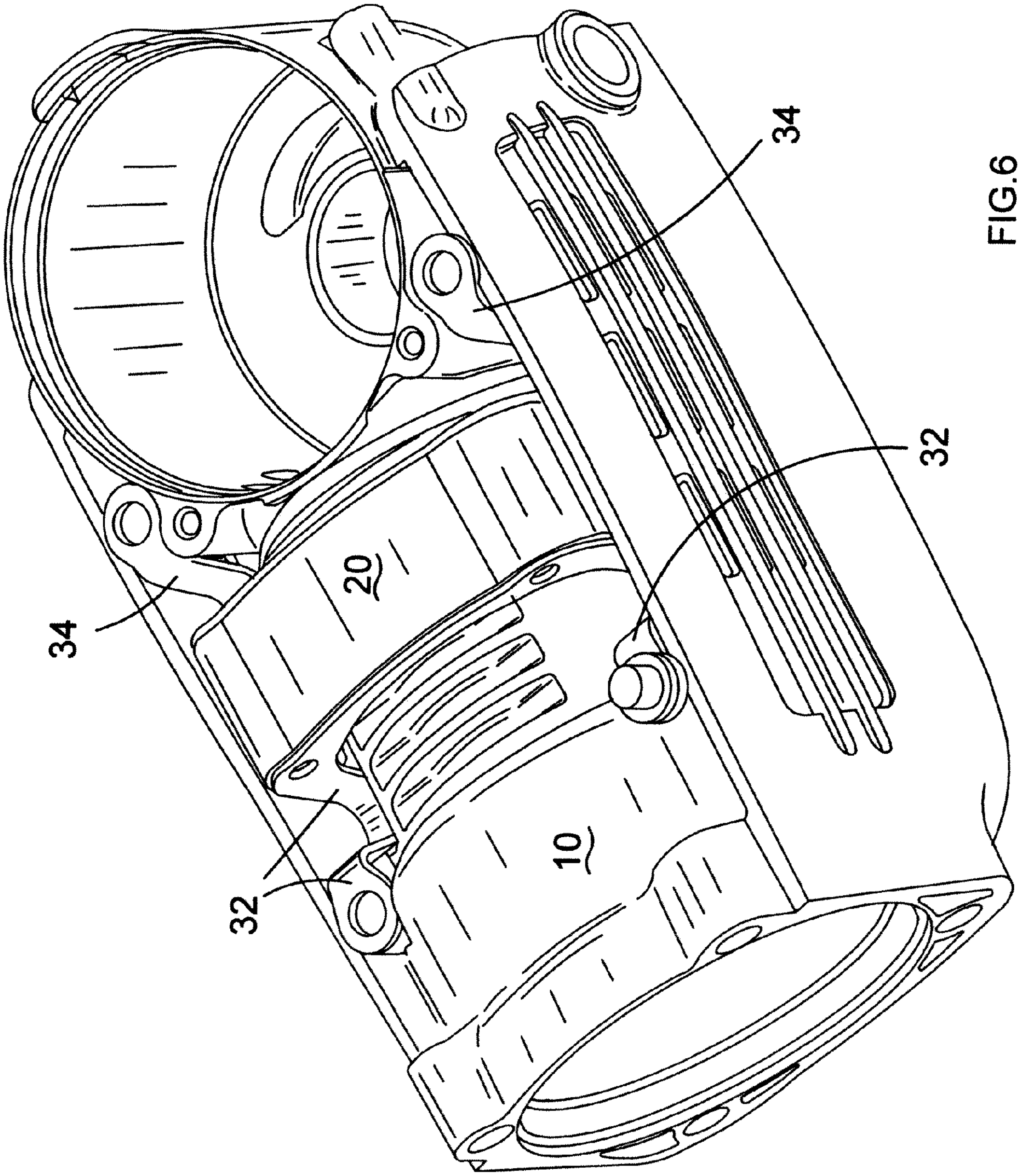
FIG. 6 shows a downward perspective view of the third embodiment.
Figure 7:
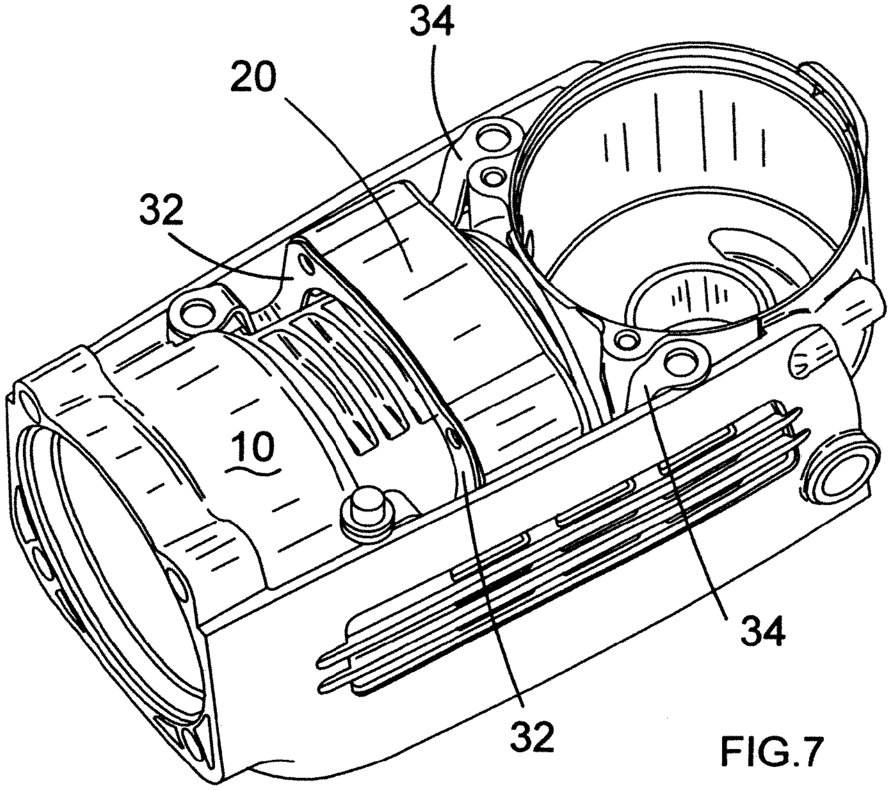
FIG. 7 shows a second downward perspective view of the third embodiment.
Figure 8:
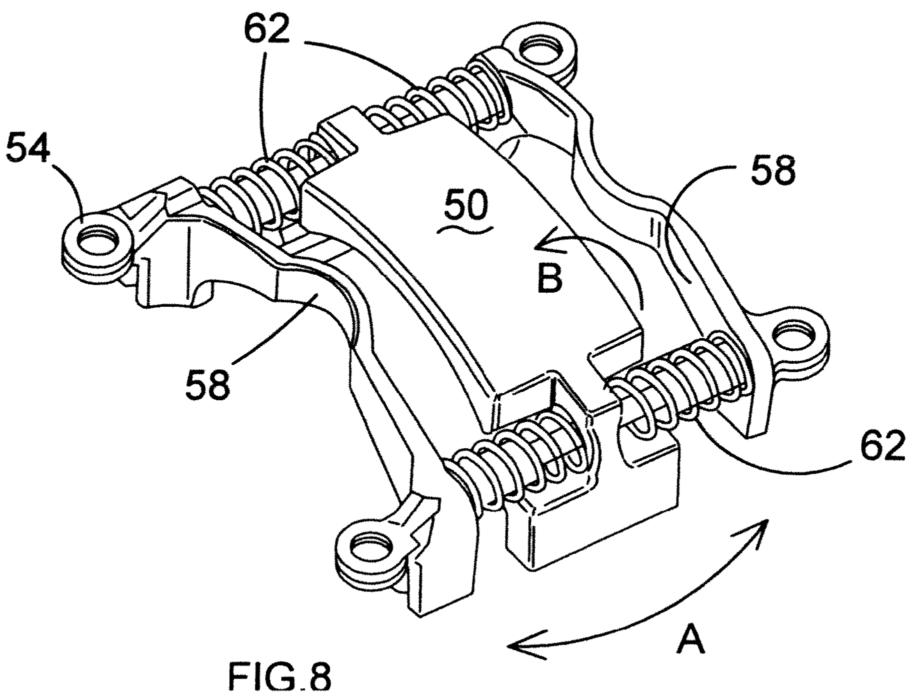
FIG. 8 shows a perspective view of the fourth embodiment of the anti-vibration mechanism.
Figure 9:
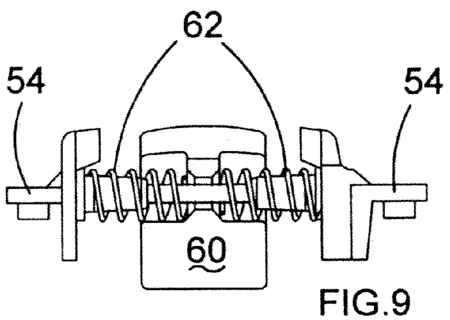
FIG. 9 shows a side view of the anti-vibration mechanism of the fourth embodiment.
Figure 10:
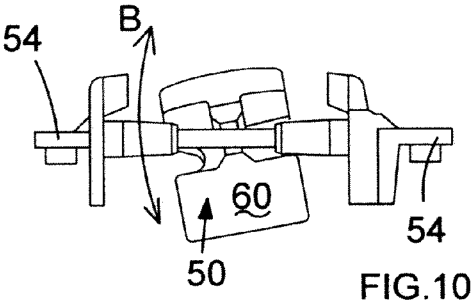
FIG. 10 shows a side view of the vibration counter mass mechanism, with the metal weight twisted about a horizontal axis, with the springs omitted.
Figure 11:
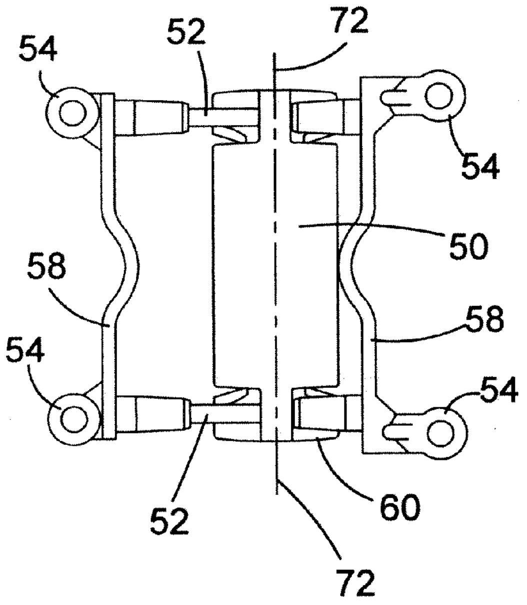
FIG. 11 shows a top view of the anti-vibration mechanism, with the metal weight slid to one side (right), with the springs omitted.
Figure 12:
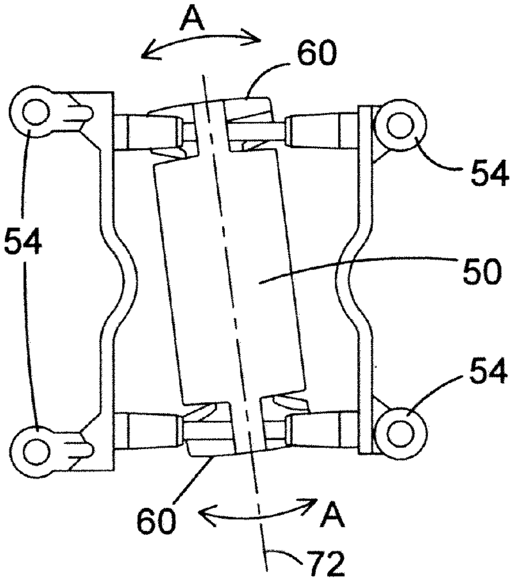
FIG. 12 shows a top view of the anti-vibration mechanism, with the metal weight twisted about a vertical axis, with the springs omitted.

In order to improve the performance of the leaf springs 32,34, each of the two leaf springs 32,34 are constructed from two layers 44,42 of sheet metal as best seen in FIG. 5. The two sheets of metal 44,42 are located on top of each other as shown. This provides an improved damping performance when used in this application. It also provides better support for the metal weight and improves the damping efficiency.

FIGS. 8 to 19 shows a fourth embodiment of the anti-vibration mechanism.

This embodiment operates in a similar manner as the first embodiment. Where the same features are present in the fourth embodiment which are present in the first embodiment, the same reference numbers have been used.

A metal weight 50 is slideably mounted on two rods 52, the ends of which terminate in metal rings 54. The metal rings 54 are used to attach the rods 52 to the top section 10 of the housing 2 using screws 56 which pass through the rings 54 and are screwed into the top section 10. A cross bar 58 attaches between each pair of rings 54 as shown to provide a structure as shown.

Two sides of the metal weight 50 comprise a supporting mount 60 which are each capable of sliding along one of the rods 52. A spring 62 is located between each end of the rods 52 adjacent the rings 54 and a side of the supporting mounts 60. The four springs cause the metal weight 50 to slide to the centre of the rods 52. The springs are compressed. The ends of the springs adjacent the rings are connected to the ends of the rod. The other ends, abutting the supporting mounts are not connected to the supporting mounts, but are merely biased against them by the force generated by the compression of the springs.

As the hammer vibrates, the metal weight can slide backward and forwards along the rods out of phase with the vibrational movement of the vibrations of the hammer to counteract the effects of the vibrations.

Figure 18:
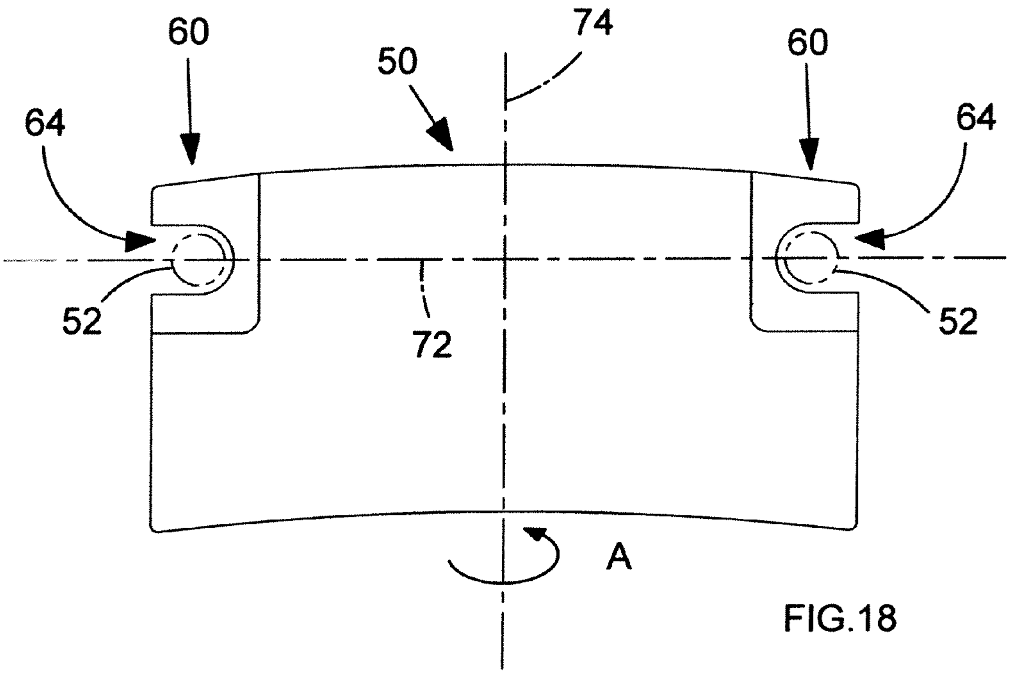
FIG. 18 shows a sketch of the front of the metal weight.

The supporting mounts 60 are designed in such a manner that they comprise a sideways facing vertical C shaped slot 64 as best seen in the sketch FIG. 18. This provides for easy assembly. It also allows the metal weight 50 to twist in direction of Arrow A in Figure as it slides along the rods 52. This enables the metal weight 50 to twist about a vertical axis 74 enabling it to counteract vibrations in a direction other than parallel to the longitudinal axis 66 of the spindle.

Figure 19:
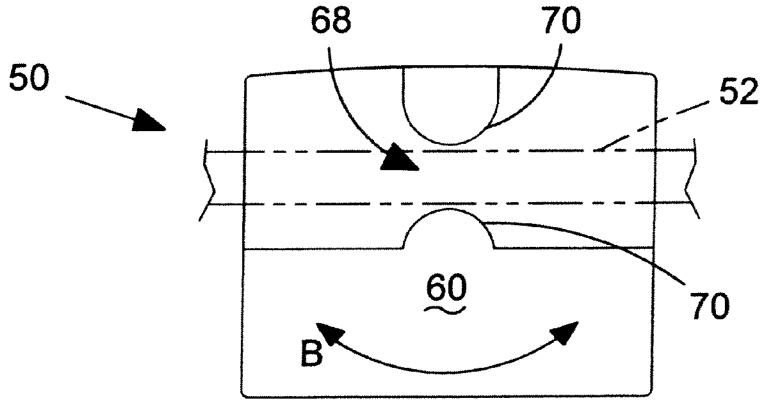
FIG. 19 shows a sketch side view of the metal weight.

The supporting mounts 60 are also designed in such a manner that they comprise a sideways horizontal slot 68 as best seen in the sketch FIG. 19 (not enclosed electronically). The two sides 70 of the horizontal slot 68 are convex as shown in the sketch. This also provides for easy assembly. It also allows the metal weight 50 to twist in the direction of Arrow B in FIG. 19 whilst it is mounted on the rods 52. This enables the metal weight to twist about a horizontal axis 72 which is roughly perpendicular to the longitudinal axes of the rods 52. This also allows the metal weight 50 to counteract vibrations in a direction other than parallel to the longitudinal axis 66 of the spindle.

Figure 13A:
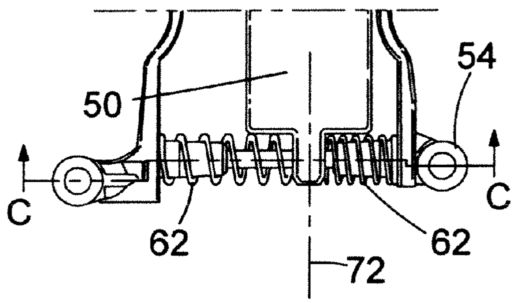
FIG. 13A shows half of the anti-vibration mechanism, with the metal weight slid to one side (right)
Figure 13B:
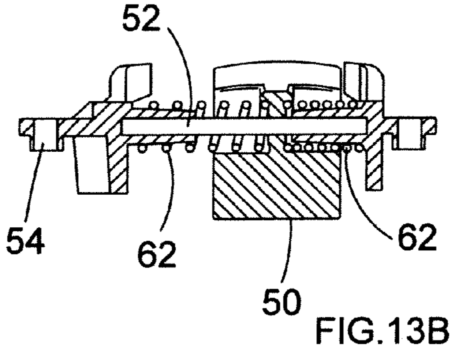
FIG. 13B shows a vertical cross section of the anti-vibration mechanism in FIG. 13A in the direction of Arrows C.
Figure 14A:
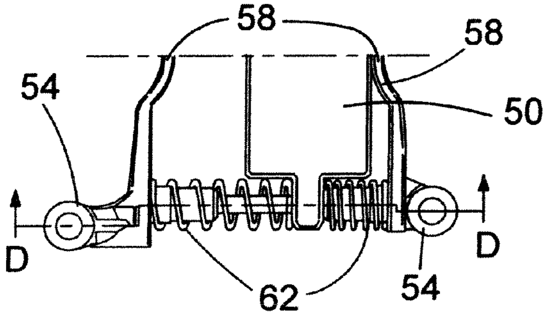
FIG. 14A shows half of the anti-vibration mechanism, with the metal weight slid to one side (right) further than that shown in FIG. 13A.
Figure 14B:
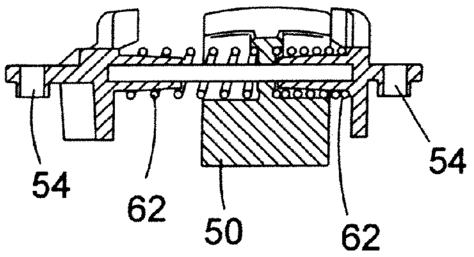
FIG. 14B shows a vertical cross section of the anti-vibration mechanism in FIG. 14A in the direction of Arrows D.
Figure 15:
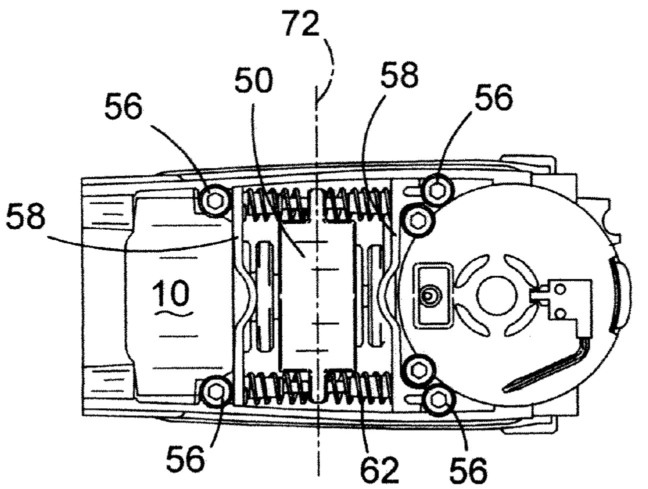
FIG. 15 shows a top view of the anti-vibration mechanism mounted on the top section of a hammer.
Figure 16:
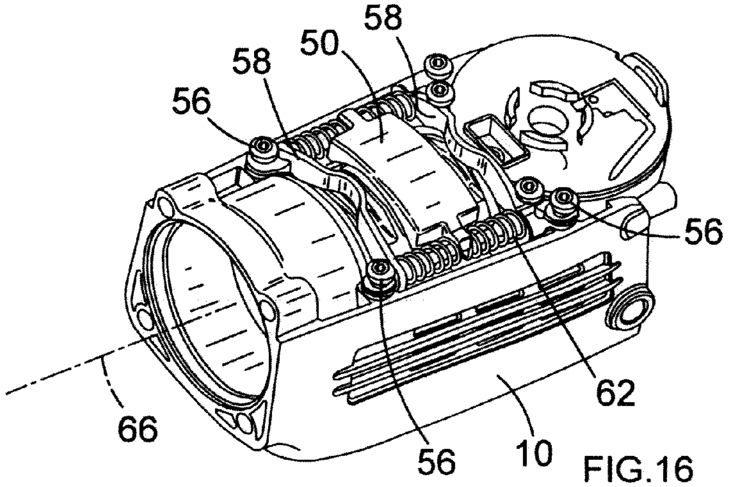
FIG. 16 shows a perspective view of the anti-vibration mechanism mounted on the top section of a hammer.
Figure 17:
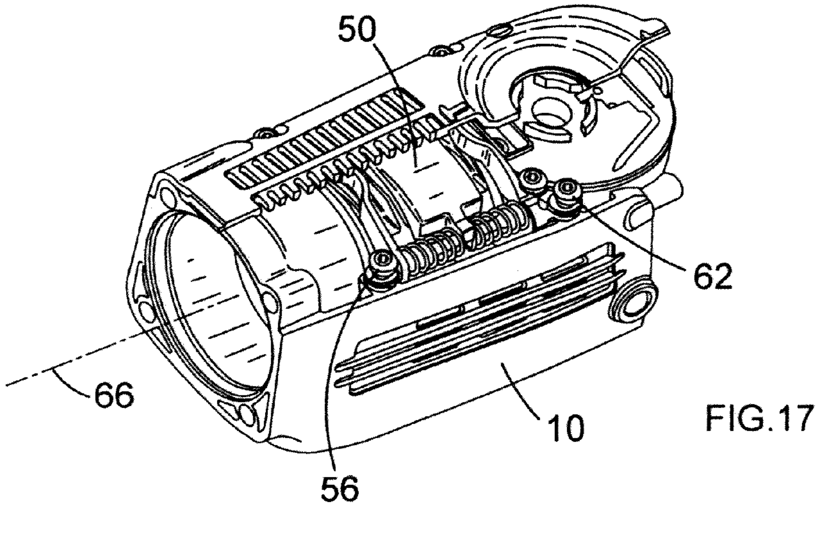
FIG. 17 shows a perspective view of the anti-vibration mechanism mounted on the top section of a hammer with part of the outer casing covering the vibration mechanism.

FIG. 13A shows the metal weight 50 when it is slid around approximately 66% along the length of the rods 52 towards the right. The left hand springs 62 are larger in length due to being allowed to expand. The right hand springs 62 are shorter in length due to being compressed by the movement of the metal weight 50. However, in this position, the ends of the springs 62 abut against the sides of the supporting mounts 60 due to the force of the springs 62 as they are compressed. However, if the metal weight 50 is slid further along the length of the rods 52 towards the right, the left hand spring 62 disengages with the side of the supporting mount 60 due to the length of the spring 62 being shorter than the length of rod 52 along which the metal weight 50 can travel. This results in the right hand spring 62 only being in contact with the supporting mounts 60. As such, as the metal weight 50 slides right as shown in FIG. 13A until the right hand springs 62 become fully compressed, only one spring 62 per rod 52 providing a dampening force on the metal weight 50. This alters the spring characteristics of the vibration dampener. This enables the spring dampener to be designed so that, when the vibrations on the hammer are at their most extreme and metal weight 50 is travelling at the greatest distance from the centre of the rods 52 along the length of the rods 52, the spring characteristics can be altered when the metal weight 50 is at its most extreme positions to counteract this.

The invention claimed is:

1. A hammer drill comprising:

a body;

a motor located in the body;

a centre of gravity located within the body;

a tool holder;

a hammer mechanism, driven by the motor when the motor is activated;

a counter mass slideably mounted within the body on a rod and located above the centre of gravity, the counter mass capable of sliding movement in a forward direction and a rearward direction between a first end position and a second end position and the counter mass comprises a vertical C shaped slot which engages with the rod to allow the counter mass to twist about a vertical axis;

a biasing member which biases the counter mass to a third position located between the first end position and the second end position; and wherein the mass of the counter mass and the strength of the biasing member are such that the sliding movement of the counter mass acts to at least partially counteract vibrations of the hammer drill generated by the operation of the hammer mechanism.

2. A hammer drill as claimed in claim 1 wherein the hammer mechanism comprises a piston and ram having an axis of travel and wherein the counter mass is located above the axis of travel.

3. A hammer drill as claimed in claim 2 wherein the axis of travel is located above the centre of gravity of the hammer.

4. A hammer drill as claimed in claim 3 wherein the mass of the counter mass and the strength of the biasing member are such that the sliding movement of the counter mass further acts to at least partially counteracts twisting movement of the hammer about the centre of gravity generated by the operation of the hammer mechanism.

5. A hammer drill as claimed in claim 1 wherein the counter mass is twistable about a substantially vertical axis.

6. A hammer drill as claimed in claim 1 wherein the counter mass is twistable about a substantially horizontal axis.

7. A hammer drill as claimed in claim 6 wherein the substantially horizontal axis is substantially perpendicular to the direction of travel of the counter mass.

8. A hammer drill as claimed in claim 1 wherein the rod is mounted along a forward and rearward axis.

9. A hammer drill as claimed in claim 1 wherein the biasing member comprises at least one spring.

10. A hammer drill as claimed in claim 9 wherein the spring is a helical spring which is coaxial with the rod.

11. A hammer drill as claimed in claim 10 wherein the springs includes a first end fixed in proximity to an end of the rod.

12. A hammer drill as claimed in claim 11 wherein the spring includes a second end which abuts the counter mass in the third position.

13. A hammer drill as claimed in claim 12 wherein, the spring abuts the counter mass when the counter mass is in the first end position and is fully relaxed when the counter mass is in the second end position.

14. A hammer drill as claimed in claim 10 wherein the helical spring is a first spring and the hammer drill further comprises a second spring, and the first spring is mounted coaxial with the rod on a first side of the counter mass and the second spring is mounted coaxial with the rod on a second side of the counter mass.

15. A hammer drill as claimed in claim 14 wherein the first spring and the second spring abut the counter mass when the counter mass is in the third position, the first spring abuts the counter mass and the second spring is fully relaxed when the counter mass is in the first end position, and the second spring abuts the counter mass and the first spring is fully relaxed when the counter mass is in the second end position.

16. A hammer drill as claimed in claim 15 wherein the rod is a first rod, and the hammer drill further comprises a second rod mounted parallel to the first rod.

17. A hammer drill as claimed in claim 16 and further comprising a third spring and a fourth spring mounted coaxial with the second rod.

18. A hammer drill as claimed in claim 1 wherein the counter mass comprises a sideways horizontal slot which engages with the rod to allow the counter mass to twist about a horizontal axis.

19. A hammer drill as claimed in claim 1 wherein the counter mass is suspended by the biasing member.

20. A hammer drill as claimed in claim 19 wherein the biasing member is a leaf spring.

21. A hammer drill as claimed in claim 19 wherein the biasing member comprises a first leaf spring and a second leaf spring.

22. A hammer drill as claimed in 19 wherein the leaf spring includes a portion constructed of two layers of resiliently deformable material connected to each other.

23. A hammer drill comprising:

a body;

a motor located in the body;

a hammer drill centre of mass located within the body;

a hammer mechanism, driven by the motor, when the motor is activated; in reciprocating motion along a hammer axis, the hammer axis a first perpendicular distance from the centre of mass;

a counter mass mounted within the body for a sliding movement along a slide axis between a first end position and a second end position, the slide axis parallel to and spaced from the hammer axis, and the slide axis a second perpendicular distance from the centre of mass, and the second perpendicular distance is greater than the first perpendicular distance;

a means for biasing the counter mass to a third position located between the first end position and the second end position; and wherein the counter mass is supported within the body by means for permitting a twisting movement about a twist axis.

24. A hammer drill according to claim 23 and further comprising a means for supporting the counter mass in the sliding movement.

25. A hammer drill according to claim 23 wherein the twist axis is substantially perpendicular to the slide axis.

* * * * *